June 19, 1951  L. A. BUCHANAN  2,557,336
AUTOMATIC GASOLINE HOSE MEASURING CUTOFF NOZZLE
Filed March 31, 1947  3 Sheets-Sheet 1
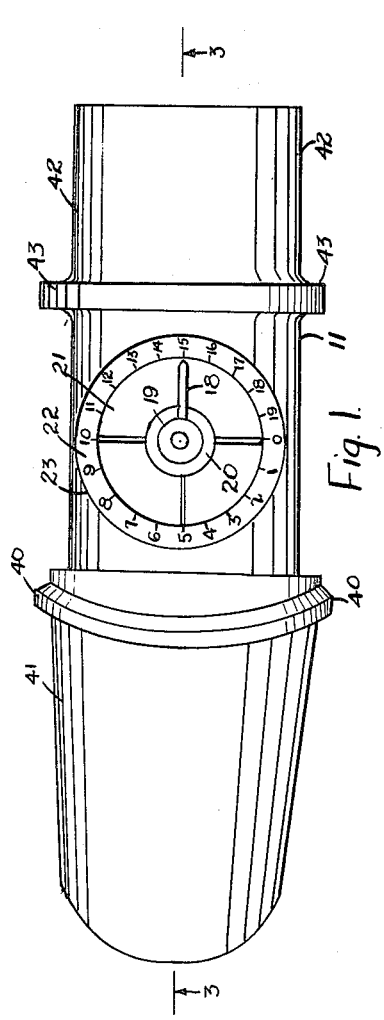
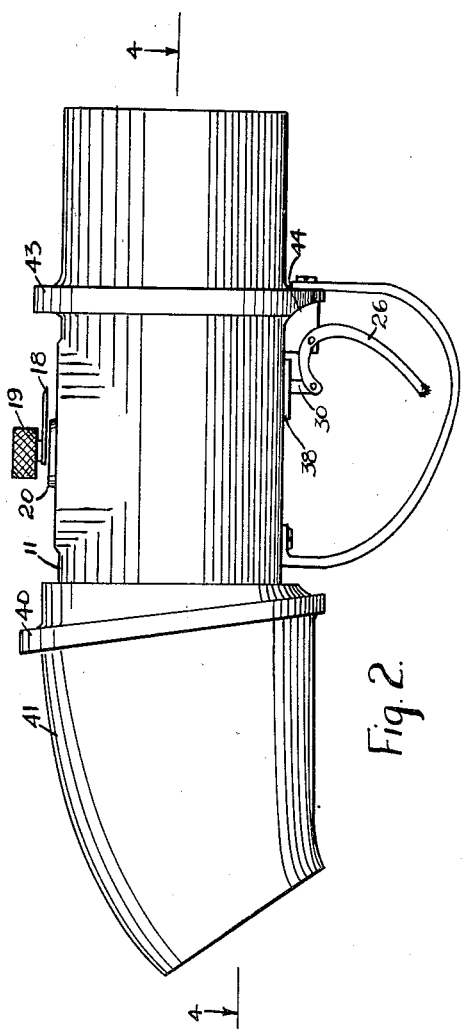
INVENTOR
Lloyd A. Buchanan
BY
Mawhinney & Mawhinney
ATTORNEYS June 19, 1951 — L. A. BUCHANAN — 2,557,336
AUTOMATIC GASOLINE HOSE MEASURING CUTOFF NOZZLE
Filed March 31, 1947 — 3 Sheets-Sheet 2
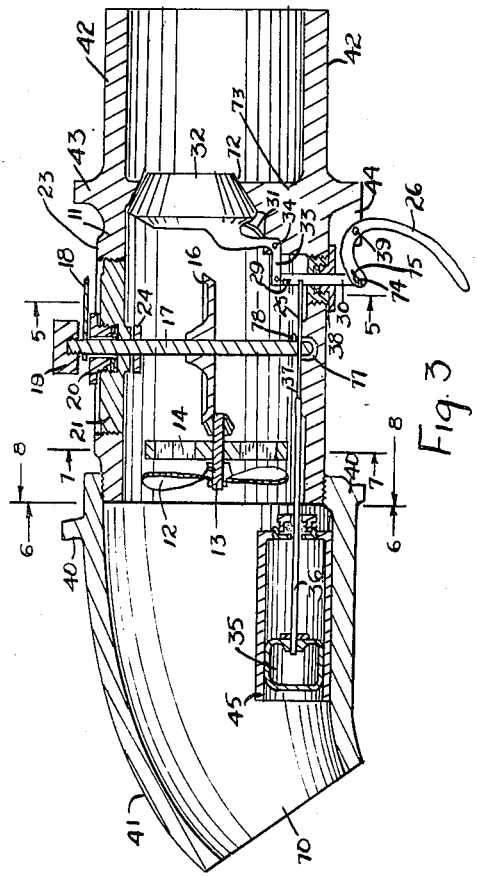
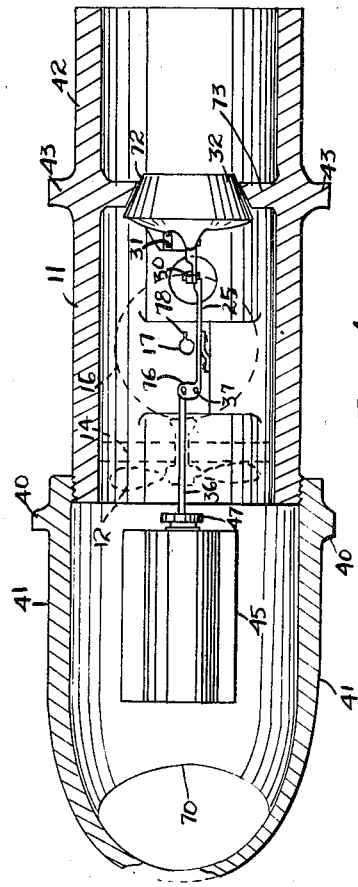
INVENTOR.
Lloyd A. Buchanan
BY
Mawhinney & Mawhinney
ATTORNEYS

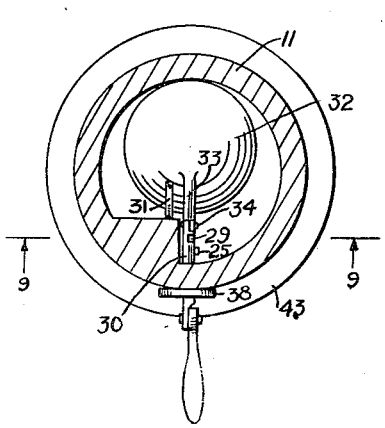
Fig. 5
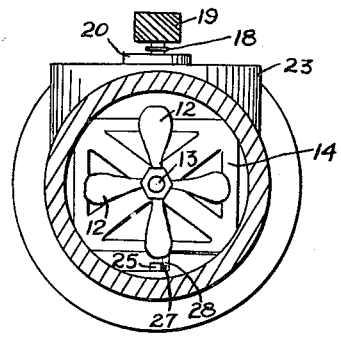
Fig. 6.
Fig. 9
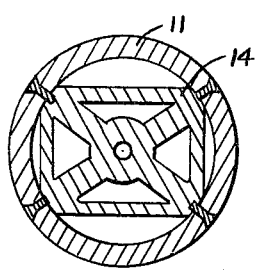
Fig. 7.
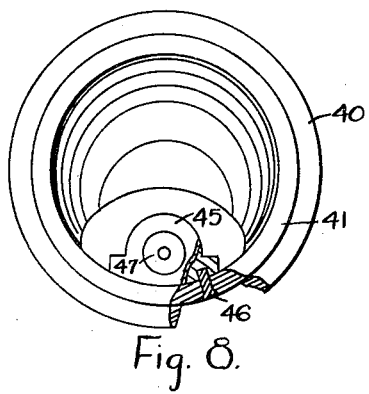
Fig. 8.
INVENTOR.
Lloyd A. Buchanan
BY
Mawhinney & Mawhinney
ATTORNEYS Patented June 19, 1951

2,557,336

UNITED STATES PATENT OFFICE 2,557,336

AUTOMATIC GASOLINE HOSE MEASURING CUTOFF NOZZLE

Lloyd A. Buchanan, Panama City, Fla., assignor of one-tenth to John B. Newman, Opelika, Ala., and nine-tenths to Grover T. Bodiford Application March 31, 1947, Serial No. 738,257

1 Claim. (Cl. 222—20)

The present invention relates to improvements in automatic gasoline hose measuring cut off nozzle of the type which is used to fill the fuel tanks of automobiles with gasoline, and the invention has for its object and main purpose to provide a more efficient nozzle in that the nozzle contains automatic mechanism for shutting off the flow of the fuel to the vehicle tank when the desired or proper amount of gasoline has been delivered into such vehicle tank.

Another object of the invention is to provide an improved automatic hose nozzle which is of simple construction requiring of the attendant only two manual operations, namely in the first place the setting of a dial hand or index pointer a desired angular distance from a zero position to show the amount of gasoline desired; and in the second place the pulling back or cocking of a trigger which operates to open a fuel valve in the automatic mechanism of the hose nozzle.

A further object of the invention is to provide an improved automatic hose nozzle so constructed and arranged that the individual parts may be easily assembled and adjusted whenever desired or necessary.

A still further object of the invention resides in providing a volume flow measuring gear train actuated by a propeller in the flow stream, characterized by the fact that there is no spring tension applied to such gear train or propeller, by reason of which there is eliminated any possibilty of varying or changing the accurate measuring of the flow of the fuel.

A still further object of the invention is to provide an improved automatic hose nozzle capable of being adjusted in width or length without lessening its efficiency.

A still further object and advantage of the invention is to provide an improved automatic hose nozzle constructed and operating to greatly reduce fire hazards at gasoline filling stations by automatically avoiding the overflowing of fuel tanks.

With the foregoing and other objects in view the invention will be more fully described hereinafter and more particularly pointed out in the appended claim.

In the drawings, in which like parts are denoted by the same reference characters throughout the several views, Figure 1 is a top plan view of an improved automatic hose nozzle constructed in accordance with the present invention.

Figure 2 is a side elevation of the same.

Figure 3 is a longitudinal vertical central section taken on the line 3—3 in Figure 1.

Figure 4 is a horizontal section taken on the line 4—4 in Figure 2.

Figure 5 is a transverse vertical section taken on the line 5—5 in Figure 3.

Figure 6 is a similar section taken on the line 6—6 in Figure 3.

Figure 7 is also a transverse vertical section taken on the line 7—7 in Figure 3.

Figure 8 is a similar view taken on the line 8—8 in Figure 3, and

Figure 9 is a cross sectional view taken through a trigger operated rod and showing the locking notch.

Referring more particularly to the drawings a conventional hose nozzle 41 having an open delivery mouth 70 is screw threaded or otherwise connected, as indicated at 71, to a tubular casing 11 of metal or other appropriate material having an extension shank 42 over which the end of a rubber or other hose may be received with the end of the hose abutting against the outstanding flange 43.

In present practice the gasoline flows freely from the hose which is connected to the pump and thence to the nozzle 41 which is curved in order that it may be fitted into the filling neck of the gasoline tank on the vehicle.

In accordance with the invention flow from the hose to the nozzle 41 is under the control of a valve 32 pivoted at 34 on the interior part of the casing 11 and adapted to close against a seat 72 made in the septum or diaphragm 73 extending across the interior of the tubular casing 11, preferably for reinforcement in alignment with the external flange 43.

The valve 32 is biased to a closed position against its seat 72 by a spring 31. The arm 33 which pivotally supports the valve 32 is a bell crank composed of a vertical branch which is connected directly to the valve 32 and a horizontal branch which is pivoted to the upper end of a vertically reciprocating bar 30. The bar is slidable up and down in a stuffing or packing box 38, its lower end being exposed beneath the casing 11 for pivotal entrainment with the slotted end portion of a trigger 26 pivoted at 39 in the recess 44 of the outstanding flange 43. The pivot 74 carried by the lower end of the reciprocating bar 30 plays in an arcuate slot 75 in the upper end of the trigger 26.

The bar 30 at its upper portion is provided with a locking notch 29 adapted in the lowered position of the bar 30 to be engaged by the free end of a locking lever 25 pivoted on a vertical pivot 37 to an interior part of the casing 11 for a limited rocking movement in a substantially horizontal plane. The lever 25 is constantly and yieldably urged to a position where its free end will press against the side of the bar 30 whereby when the bar 30 is lowered to a position where the locking notch 29 registers with the lever 25 such lever free end will enter the notch 29 and prevent the raising of the bar 30 until the requisite amount of gasoline has been delivered as hereinafter explained. The lever 25 is biased to this pressing engagement against the notched side of bar 30 by a leaf or other spring 27 which may be riveted or otherwise secured to the lever 25 and to an adjacent wall or other part of the casing 11.

The lever 25 at its pivot end 37 carries an offset 76 pivoted to a horizontally reciprocating rod 36 which plays through a stuffing box 47 carried in the closed end of a cylinder 45 mounted in the lower wall of the nozzle 41 and being maintained therein as by the use of screws or other fastenings 46 as illustrated in Figure 8. The outer end of the cylinder 45 is open adjacent the nozzle mouth 70 whereby to expose to the gasoline or other fuel rising or backing up in the nozzle 41 a float 35 which reciprocates in the cylinder 45 and is attached to the outer end of the reciprocating rod 36.

The locking lever 25 is also located adjacent, and by the spring 27 yieldably urged toward, a vertical shaft 17 stepped in a bearing 77 in the lower internal central portion of the hollow casing 11. A projection 78 on the lower portion of the vertical shaft 17 rotates in the same horizontal plane with the lever 25 and is of a sufficient radial length to encounter the lever 25 when in engagement in the locking notch 29 for the purpose of rocking the lever 25 out of this locked engagement with the rod 30.

The shaft 17 is arranged to be rotated by fuel flow conditions through the casing 11 and for this purpose a bevel gear wheel 16 is affixed to a shaft 17 preferably at an intermediate point. Such gear wheel 16 meshes with a bevel pinion 15 affixed to the inner end of a horizontal shaft 13 journaled for free rotation in a slotted cross frame 14 which will not entirely impede the flow of the fuel from encountering the blades of a propeller 12 affixed to the forward end of the horizontal shaft 13.

The shaft 17 rises through a screw or other cover plate 21 removably mounted in the top wall of the tubular casing 11, and through a stuffing or packing gland 20 carried by the cover plate 21; the upper end of the shaft 17 being exposed above the stuffing box 20 and fixedly carrying a knob 19 by which shaft 17 may be rotated together with an index or pointer also affixed to the upstanding free end of the shaft 17 above the stuffing box 20.

As shown in Figure 1, the index 18 moves over a circular scale 22 wrought upon a boss 23 upstanding from the upper portion of the tubular casing 11. The scale 22 may be graduated in terms of gallons of gasoline if desired. A cross pin 24 is carried by the shaft 17 below the cover plate 21 to restrict the upward axial motion of the shaft 17.

In the use of the device, in servicing a vehicle with gasoline, the attendant at the service station having ascertained from the customer the number of gallons of gasoline required, in the first instance sets the pointer 18 opposite the number on the scale 22 representing that desired gallonage. This is achieved by engaging the knob 19 and rotating the shaft 17 in a clockwise direction as viewed in Figure 1. The zero or origin point is at the bottom of the circular scale. The pointer or index 18 is shown to have been displaced from the zero marking through an angle of 270°. The index or pointer 18 in Figure 1 points to the number 15 on the scale 22 showing that the customer has ordered fifteen gallons of gasoline.

Having thus precisely set the pointer 18, the trigger 26 is pulled or cocked causing the same to rotate about the pivot 39 and pull down the bar 30 until its locking notch 29 registers with the free end of the locking lever 25 which promptly enters such notch under the urgency of the spring 27. At the same time when the bar 30 is pulled down it pulls upon the bell crank 33 and rotates the valve 32 to an open position. The locking engagement of the lever 25 and bar 30 will prevent the closing of the valve 32 when the trigger 26 is released. The gasoline is thereupon free to flow from the hose into the nozzle 41. In doing so it is compelled to pass and rotate the propeller 12 in the direction through the intermediary of the gear train 15—16 to rotate the shaft 17 and its index 18 in a counter-clockwise direction through a gear ratio which in concert with the calibrations of the scale 22 will require the index 18 to retire backward toward the zero mark at a speed and rate which will agree with the number of gallons of gasoline delivered to the vehicle tank. The arrangement is such that when the index 18 under the influence of the propeller 12 is returned to zero on the scale 22 fifteen gallons of gasoline will have been delivered to the vehicle tank. Inasmuch as the projection 78 and index 18 are fixed upon the shaft 17 to project in the same radial direction, when the index 18 reaches zero on the scale 22 the projection 78 will wipe across the locking lever 25 rotating it in the direction opposed to that of the action of spring 27 and forcing the free end of the lever 25 out of locking engagement with the bar notch 29. The bar 30 being thus free to rise, the spring 31 will automatically close the valve 32 against its seat 72 and shut off the flow of gasoline from the source to the nozzle 41.

In this manner the attendant may set the device at the start of the operations and the nozzle will thereupon automatically deliver to the vehicle tank the prescribed amount or volume of fuel and thereupon automatically discontinue the delivery operation.

The invention therefore unburdens the attendant from keeping a close eye on the dial of the gasoline pump and spares him that alertness necessary to shut off the conventional nozzle valve when his eye tells him that the ordered amount of gasoline has been delivered by the pump. Few attendants possess this coordination of eye and finger muscles to properly perform these sequential operations and thus over-runs of gasoline are constantly being made which naturally lead to arguments as to cost between the customer and the gasoline service station attendant. The invention provides for the immediate and automatic stoppage of delivery of the gasoline when the precise amount ordered has passed through the nozzle.

The improved device has a second automatic operation in that should the gasoline tank of the vehicle through inadvertence be filled to overflowing, the overflow liquid rising in the filling neck and thence into the nozzle 70 will back up in the cylinder 45 floating the float member 35 upwardly in the cylinder 45 or to the right, as indicated in Figure 3, it being understood that in practice the nozzle mouth 70 is thrust downwardly into the filling neck of the vehicle gasoline tank. The rising float 35 will carry with it the rod 36 which is pivoted to the offset 76 of the lever 25 thus requiring lever 25 to rock to a position disengaging its free end from the locking notch 29 of the bar 30. Thus the valve spring 31 will be enabled to promptly close the valve 32 in the event of any initiation of overflow conditions before such conditions can materialize with the ensuing hazard and fire and explosion risks incident to the spilling of gasoline from such filling necks.

For convenience in operation the knob 19 may have a knurled rim. The vertical shaft 17 is mounted for free movement in either rotary direction but the liquid cannot escape around this shaft owing to the presence of the stuffing box 20. The head or cover plate which carries this stuffing box 20 may be removed to expose an opening of a diameter slightly larger than the bevel gear 16 to permit the shaft 17 and its assembly to be originally lowered into the casing or subsequently removed.

The dial face 22 is directly applied to the boss 23 on the exterior of the tubular casing 11 so as to form a permanent non-adjustable face, thus assuring accuracy. The stop 24 on the vertical shaft 17 is for the purpose of preventing the removal of the bevel gear 16 from its proper position with reference to the dial 22 and the trip lever 25.

The spring 27 presses the trip lever 25 against the shaft 17 when the free end of the trip lever 25 occupies the locking notch 27, but when the lever 25 does not occupy the notch 29, the spring urges the free end of the lever 25 against the side edge of the vertically reciprocating bar 30 and such lever 25 outstands a short distance from the vertical shaft 17, as shown in Figure 4. The gearing 15, 16 is such as to move the index 18 at a reduced speed over that of the propeller 12 and its horizontal shaft 13.

In the case of the customer desiring his automobile or truck fuel tank filled, the station attendant places the indicator 18 at the highest possible numeral position on the dial 22. If the indicator 18 reaches the zero mark before the vehicle tank is full, such indicator 18 may be reset to the highest or a high dial numeral and the trigger 26 again pulled or cocked which will promptly reopen the valve 32 and permit the delivery of fuel to the tank. In the case of large trucks or busses this cocking of the trigger may have to be done a number of times but since it requires a minimum of effort and time and the use of only one hand, the one holding the nozzle, this additional operation will not be a hinderance.

The stuffing box 38 prevents the escape of liquid around the rod 30 as it moves up and down. The stuffing box 47 is for the purpose of keeping the flow of gasoline from entering the float chamber 45 around the rod 36.

The nozzle flange 40 is so angled as to enable the introduction of the nozzle in the proper position in the neck of the vehicle tank, and it also serves the purpose of keeping the nozzle from being thrust too far into the vehicle tank.

It will be understood that the pitch of the propeller 12 may be adjusted to expedite the proper number of revolutions per gallon gasoline or other liquid.

While I have disclosed herein the best form of the invention known to me at the present time I desire it to be understood that I reserve the right to make changes and modifications in the herein described embodiment of the invention provided such changes fall within the scope of the following claim.

What is claimed is:

An automatic hose nozzle comprising a tubular casing connecting the hose and the nozzle and having a valve seat therein, a valve biased to a closed position against said seat, external tripping means for closing said valve, connections between said valve and said tripping means, one member of said connections having a locking notch, a locking lever pivoted in said casing with its free end adapted to enter said locking notch when the valve is in an open position, resilient means for urging said lever into said notch, flow driven means in said casing comprising a propeller driver shaft, an index fixed on said shaft outwardly of said casing, a dial on said casing over which said index moves on the rotation of said shaft, a projection on said shaft substantially radially aligned with said index and positioned to engage said locking lever opposite said resilient means to eject the locking lever from the locking notch when said shaft has returned said index to the origin position of the dial scale, said shaft projecting through a stuffing box mounted in the removable cover of the casing, said dial scale being reproduced upon a substantially flat boss raised from the cylindrical contour of the external wall of said tubular casing, said shaft being at its inner end gravitationally and removably mounted in a groove step produced in the lower portion of said casing whereby the shaft may be freely lifted upwardly, and a stop member on the shaft for encountering said cover to limit the relative axial movement of the shaft and cover.

LLOYD A. BUCHANAN.

REFERENCES CITED

The following references are of record in the file of this patent:

UNITED STATES PATENTS

| Number | Name | Date |
| --- | --- | --- |
| 451,129 | Miller | Apr. 28, 1891 |
| 958,664 | Moore | May 17, 1910 |
| 1,173,614 | Sponsel | Feb. 29, 1916 |
| 1,539,081 | Fritz | May 26, 1925 |
| 1,697,840 | Hayes et al. | Jan. 1, 1929 |
| 1,709,263 | Holbert | Apr. 16, 1929 |
| 1,746,814 | Benedict et al. | Feb. 11, 1930 |
| 2,008,299 | Etzel | July 16, 1935 |
| 2,329,426 | Valiton | Sept. 14, 1943 |

FOREIGN PATENTS

| Number | Country | Date |
| --- | --- | --- |
| 863,291 | France | Jan. 2, 1941 |